United States Patent
Lutz et al.

(10) Patent No.: US 11,163,870 B2
(45) Date of Patent: Nov. 2, 2021

(54) PLANT-SPECIFIC, AUTOMATED CERTIFICATE MANAGEMENT

(71) Applicant: Siemens Aktiengesellschaft, Munich (DE)

(72) Inventors: Benjamin Lutz, Pfintzal (DE); Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 215 days.

(21) Appl. No.: 15/972,325

(22) Filed: May 7, 2018

(65) Prior Publication Data

US 2018/0322274 A1 Nov. 8, 2018

(30) Foreign Application Priority Data

May 8, 2017 (EP) .................................... 17169871

(51) Int. Cl.
*H04L 29/06* (2006.01)
*G06F 21/44* (2013.01)
(Continued)

(52) U.S. Cl.
CPC .......... *G06F 21/44* (2013.01); *G05B 19/406* (2013.01); *H04L 9/3263* (2013.01); *H04L 63/0823* (2013.01); *G05B 2219/23317* (2013.01)

(58) Field of Classification Search
CPC ... G06F 21/44; H04L 63/326; H04L 63/0823; H04L 9/3263; H04L 9/0825; H04L 67/02; G05B 19/406; G05B 2219/23317
See application file for complete search history.

(56) References Cited

U.S. PATENT DOCUMENTS 8,010,786 B1 * 8/2011 Ward ...................... H04L 63/20
713/156
8,457,318 B2 * 6/2013 Gunther ................ H04L 9/0822
380/278
(Continued)

FOREIGN PATENT DOCUMENTS

CN 101232372 7/2008
CN 102195987 9/2011
(Continued)

OTHER PUBLICATIONS

Anonymous, Prozessleitsystem—Wikipedia, XP055397767, gefunden im Internet pp. 1, 4, 2017.
(Continued)

*Primary Examiner* — Sher A Khan
(74) *Attorney, Agent, or Firm* — Cozen O'Connor

(57) ABSTRACT

A method for authenticating devices and/or applications, specifically web applications, in a control system for an industrial plant, wherein the control system includes at least one local registration service and at least one software inventory, where the method includes determining by the at least one local registration service information about which communications protocols and/or applications are supported by the devices and/or applications and/or which communications protocols and/or applications are active, during authentication of the devices and/or applications within the control system, and storing the device-specific information determined by the local registration service in the at least one software inventory of the control system.

16 Claims, 3 Drawing Sheets

(51) Int. Cl.
*H04L 9/32* (2006.01)
*G05B 19/406* (2006.01)

(56) References Cited

U.S. PATENT DOCUMENTS

| | | | | |
|---|---|---|---|---|
| 9,780,950 | B1* | 10/2017 | Dundas | H04L 9/08 |
| 10,419,931 | B1* | 9/2019 | Sohail | G06F 8/65 |
| 2003/0115455 | A1* | 6/2003 | Aull | H04L 9/006 |
| | | | | 713/156 |
| 2003/0120593 | A1* | 6/2003 | Bansal | G06Q 20/10 |
| | | | | 705/39 |
| 2004/0168053 | A1* | 8/2004 | Kaszkin | G05B 19/4185 |
| | | | | 713/153 |
| 2005/0076204 | A1* | 4/2005 | Thornton | H04L 9/3226 |
| | | | | 713/156 |
| 2007/0005713 | A1* | 1/2007 | LeVasseur | H04L 51/14 |
| | | | | 709/206 |
| 2007/0067512 | A1* | 3/2007 | Donaires | G06F 8/61 |
| | | | | 710/62 |
| 2007/0234043 | A1* | 10/2007 | Miyazawa | H04L 9/3263 |
| | | | | 713/156 |
| 2009/0185679 | A1* | 7/2009 | Haider | G06F 21/645 |
| | | | | 380/30 |
| 2009/0240941 | A1* | 9/2009 | Lee | H04L 9/3263 |
| | | | | 713/169 |
| 2010/0031028 | A1* | 2/2010 | Adams | H04L 9/3263 |
| | | | | 713/156 |
| 2011/0231940 | A1 | 9/2011 | Perumal et al. | |
| 2012/0136796 | A1* | 5/2012 | Hammad | G06Q 20/385 |
| | | | | 705/67 |
| 2013/0114610 | A1* | 5/2013 | Polcyn | H04L 49/70 |
| | | | | 370/400 |
| 2013/0159021 | A1* | 6/2013 | Felsher | G06F 21/6245 |
| | | | | 705/3 |
| 2013/0198307 | A1* | 8/2013 | Ruetschi | H04L 67/148 |
| | | | | 709/206 |
| 2014/0082715 | A1* | 3/2014 | Grajek | G06F 16/955 |
| | | | | 726/8 |
| 2014/0173688 | A1* | 6/2014 | Fischer | H04L 9/321 |
| | | | | 726/1 |
| 2014/0180883 | A1* | 6/2014 | Regan | G06Q 40/123 |
| | | | | 705/31 |
| 2014/0208390 | A1* | 7/2014 | Brown | G05B 11/01 |
| | | | | 726/4 |
| 2014/0259124 | A1* | 9/2014 | Petersen | H04L 63/0823 |
| | | | | 726/4 |
| 2014/0282916 | A1 | 9/2014 | Gast | |
| 2015/0020152 | A1* | 1/2015 | Litichever | H04L 63/08 |
| | | | | 726/1 |
| 2015/0032633 | A1* | 1/2015 | Haider | G06F 19/00 |
| | | | | 705/51 |
| 2015/0281233 | A1* | 10/2015 | Asenjo | G06F 9/5072 |
| | | | | 726/7 |
| 2016/0057134 | A1 | 2/2016 | Falk et al. | |
| 2016/0112406 | A1* | 4/2016 | Bugrov | H04L 63/0823 |
| | | | | 726/10 |
| 2016/0315778 | A1 | 10/2016 | Le Saint et al. | |
| 2017/0093838 | A1* | 3/2017 | Eckl | H04L 63/0869 |
| 2017/0094509 | A1* | 3/2017 | Mistry | H04L 63/0823 |
| 2018/0004953 | A1* | 1/2018 | Smith, II | G06F 21/78 |
| 2018/0278607 | A1* | 9/2018 | Loladia | H04L 61/1588 |
| 2019/0050844 | A1 | 2/2019 | Pan | |
| 2019/0075134 | A1 | 3/2019 | Ylonen | |
| 2019/0132122 | A1* | 5/2019 | Foerder | H04L 9/0838 |
| 2019/0245856 | A1* | 8/2019 | Irwan | G06F 15/76 |
| 2020/0119969 | A1* | 4/2020 | Niederfeld | H04L 63/0823 |

FOREIGN PATENT DOCUMENTS

| | | |
|---|---|---|
| CN | 102792313 | 11/2012 |
| CN | 103297816 | 9/2013 |
| CN | 103748526 | 4/2014 |
| CN | 104471609 | 3/2015 |
| CN | 105912272 | 8/2016 |
| DE | 102011081804 | 2/2013 |
| DE | 102013205051 | 9/2014 |
| WO | WO 2013/093209 | 6/2013 |

OTHER PUBLICATIONS

Office Action dated Aug. 28, 2020 issued in Chinese Patent Application No. 201810360383.1.

Office Action dated Sep. 1, 2021 issued in Chinese Patent Application No. 201810360383.1.

Peng, Yinghui, "The Application of PKCS12 Digital Certificate in User Identity Authentication System", World Congress on Software Engineering, pp. 351-355, 2009.

* cited by examiner

PLANT-SPECIFIC, AUTOMATED CERTIFICATE MANAGEMENT

BACKGROUND OF THE INVENTION

1. Field of the Invention

The invention relates to a control system and a method for authenticating devices and/or applications, in particular web applications, in the control system for an industrial plant.

2. Description of the Related Art

In the context of a technical, industrial plant, "operating certificates" are used at runtime to enable authentication and communication integrity of communication participants in a control system of the technical, industrial plant by cryptographic means.

Here, a private key securely stored in a device is bound to an associated public key. Automated assistance in the procedures for managing operating certificates and the associated cryptographic keys in the context of a Public Key Infrastructure (PKI), in particular as the basis for secure communication between applications and devices within the industrial plant, is becoming increasingly significant in this connection.

Flexibility and interoperability in the context of the industrial plant can be increased by reducing manual actions in the course of certificate management and by making increasing use of automated procedures based on standard protocols, i.e., for rolling out and renewing certificates.

Automated management of operating certificates is conventionally achieved in the context of a plant using a standard protocol, such as the Certificate Management Protocol (CMP). Here, devices and applications request the necessary operating certificates on a situational basis from a local registration service known as the Local Registration Authority (LRA). This occurs, for example, in the case of a renewal that has become necessary due to the expiration or revocation of the certificate.

The devices and applications here send a request, i.e., a Certificate Signing Request (CSR), to the local registration service. The local registration service checks the request by initially verifying the validity of a signature with which the request is signed. The local registration service then checks whether a device certificate, a serial number and optionally further identifying features of the devices or applications is/are stored in a software inventory or inventory of the control system of the industrial plant. If the check is successful, then the request is forwarded to the "Certification Authority" (CA) which issues an operating certificate for the device or application.

When the above-mentioned standard protocols are used, the devices and applications are only enabled to send the request to the local registration service itself. The individual devices and applications have no knowledge about the topology of the industrial plant, about communication relationships between the individual communication participants of the plant or about other circumstances of the industrial plant.

When necessary, each device or each application itself requests an operating certificate, which results in a high volume of communication in the industrial plant or the control system thereof.

The functionalities required for rolling out certificates have hitherto been integrated into the "engineering" components of the control system of the industrial plant. Here, certificates are loaded into the selected devices or applications in the course of a loading procedure using proprietary transport pathways. A device replacement, which involves rolling out a new certificate or a certificate renewal in the case of an existing device or application, thus requires the certificates to be reloaded in the course of a new loading procedure. This in turn entails shutting down the industrial plant.

SUMMARY OF THE INVENTION

In view of the foregoing, it is an object of the present invention to allow devices and/or applications to be replaced during runtime of an industrial plant.

This and other objects and advantage are achieved in accordance with the invention by a method for authenticating devices and/or applications, in particular web applications, in a control system for an industrial plant and by a control system for the industrial plant authentication of the devices and/or applications within the control system, information is determined by at least one local registration service as to which communications protocols and/or applications are supported by the devices and/or applications and/or which communications protocols and/or applications are active. This information determined by the at least one local registration service is stored in at least one software inventory of the control system.

In addition to the actual authentication, during which the devices and/or applications identify themselves to the local registration service, in accordance with the invention the local registration service determines which communications protocols and/or applications are supported (as standard) by the respective device and/or application, or which communications protocols and/or applications are enabled. As a result, the local registration service is capable of providing the respective devices/applications solely with the certificates that are required for use of a specific protocol, such as HTTPS, Secure Syslog or OPC UA, or for use of a specific application. This device-/application-specific information is subsequently stored by the local registration service in the software inventory so that it is available for further procedures. The devices and/or applications are advantageously authenticated based on operating certificates.

In an advantageous embodiment of the method, the devices and/or applications authenticate themselves to the local registration service upon start-up of the industrial plant to register themselves as trustworthy communication participants in the industrial plant. The devices and/or applications can also be authenticated at runtime of the industrial plant. This may be necessary if devices or applications are replaced during runtime of the industrial plant.

The software inventory of the control system advantageously stores information regarding the configuration of the control system and/or of the industrial plant operated with the control system. Here, the information may be read from an engineering component, i.e., an Engineering Station (ES), of the control system. The engineering component may, without limitation thereto, be a SIMATIC PCS 7 Industrial Workstation. Changes to the configuration of the control system are advantageously immediately reflected in the software inventory at runtime of the industrial plant.

In another advantageous embodiment of the invention, the local registration service reads out the information stored in the software inventory to check, during authentication of the devices and/or applications, which operating certificate can be assigned to the respective device and/or application.

The local registration service may particularly advantageously use the information, in addition to the authentication method in accordance with the invention, to include a network configuration of the industrial plant and communication relationships between individual participants of the industrial plant in the check which is performed during the authentication.

Specifically, this means that the local registration service checks whether the devices/applications make active use of the communication relationships between the individual participants and thus also actually require the corresponding certificates. As a result, the certificates can be allocated still more specifically to the individual devices/applications, whereby the overall number of certificates to be allocated can be reduced. This is accompanied by a reduction in the complexity of certificate management. As a result, the communication overhead in the control system of the industrial plant or the industrial plant itself can be distinctly reduced.

In the event of the check being successful, the local registration service can forward the request to a certification body or "Certification Authority" (CA), which issues an operating certificate for the devices/applications and provides it to the local registration service. The local registration service then forwards the operating certificate to the respective device or application.

The authentication or respective operating certificate of the devices and/or applications preferably have a specific period of validity that is stored as device-specific information in the software inventory. Prior to expiration of the period of validity of the authentication or operating certificate and independently of a request by the devices and/or applications, the local registration service of the control system reads out information regarding the period of validity from the software inventory and, if necessary, renews the authentication by the period of validity of the authentication, i.e., the period of validity of the respective operating certificate.

A sub-service of the local registration service can monitor the period of validity of the authentication or operating certificates. The sub-service in particular monitors the expiration date of certificates. If the sub-service establishes that a certificate will shortly expire, then a replacement certificate is requested from the higher-level local registration service or from a further sub-service. A current configuration of the control system or of the industrial plant is taken into account here, i.e., for example, how many participants are registered and what characteristics they have or which certificates they are currently using or will use in future.

Monitoring expiration of the period of validity of the authentication or certificates by the local registration service can be initiated by external events. For example, the local registration service can obtain a status signal or a trigger signal from the certification body and thereupon check the period of validity of the authentication or certificates. The local registration service then, if required, requests a replacement certificate on behalf of any desired device in accordance with the corresponding check as explained above. The communication overhead in the control system of the industrial plant or the industrial plant itself can be distinctly reduced as a result. A private key of the respective device or respective application also remains secure in the device or application when a certificate is requested. Only a public key is transferred to the software inventory, thereby increasing and/or simplifying secrecy within the control system and specifically towards the outside world.

The disclosed embodiments of the method for authenticating devices or applications, in particular web applications, are preferably used in a control system for an industrial plant, which system comprises at least one local registration service. Here, the control system advantageously comprises at least one software inventory for storing the data determined during implementation of the method in accordance with disclosed embodiments of the invention.

In a preferred embodiment, the control system additionally comprises at least one process data archive known as a Process Historian. Here, software inventory is integrated into the process data archive. The process data archive is particularly suitable as a data source within the control system because it is configured such that it is highly available, whereby the method in accordance with disclosed embodiments of the invention can be applied particularly efficiently in a control system developed in this manner.

The control system preferably additionally comprises at least one engineering component and/or at least one operator system known as an Operator Station (OS). The operator system may, without limitation thereto, be a SIMATIC PCS 7 Industrial Workstation. Here, local registration service is integrated in the engineering component and/or the operator system or the server associated with the operator system. There is thus no need to use additional (hardware) components to implement the local registration service. Instead, the local registration service can be integrated into an existing architecture of a control system of an industrial plant. No additional hardware is thus necessary, which keeps the capital investment for such an improved control system low.

In the course of a preferred use, the control system can be used for operating an industrial plant.

The authentication method in accordance with disclosed embodiments of the invention and the associated control system and any advantageous developments thereof meet the requirements corresponding to security levels 2 to 4 of International Electrotechnical Commission (IEC) standard 62443-3-3 with regard to "Public Key Infrastructure" (PKI).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described characteristics, features and advantages of the present invention and the manner in which these are achieved will become clearer and more distinctly comprehensible from the following description of the exemplary embodiments, which are explained in greater detail in connection with the drawings, in which.

DETAILED DESCRIPTION OF THE PRESENTLY EXEMPLARY EMBODIMENTS

Figure 1:
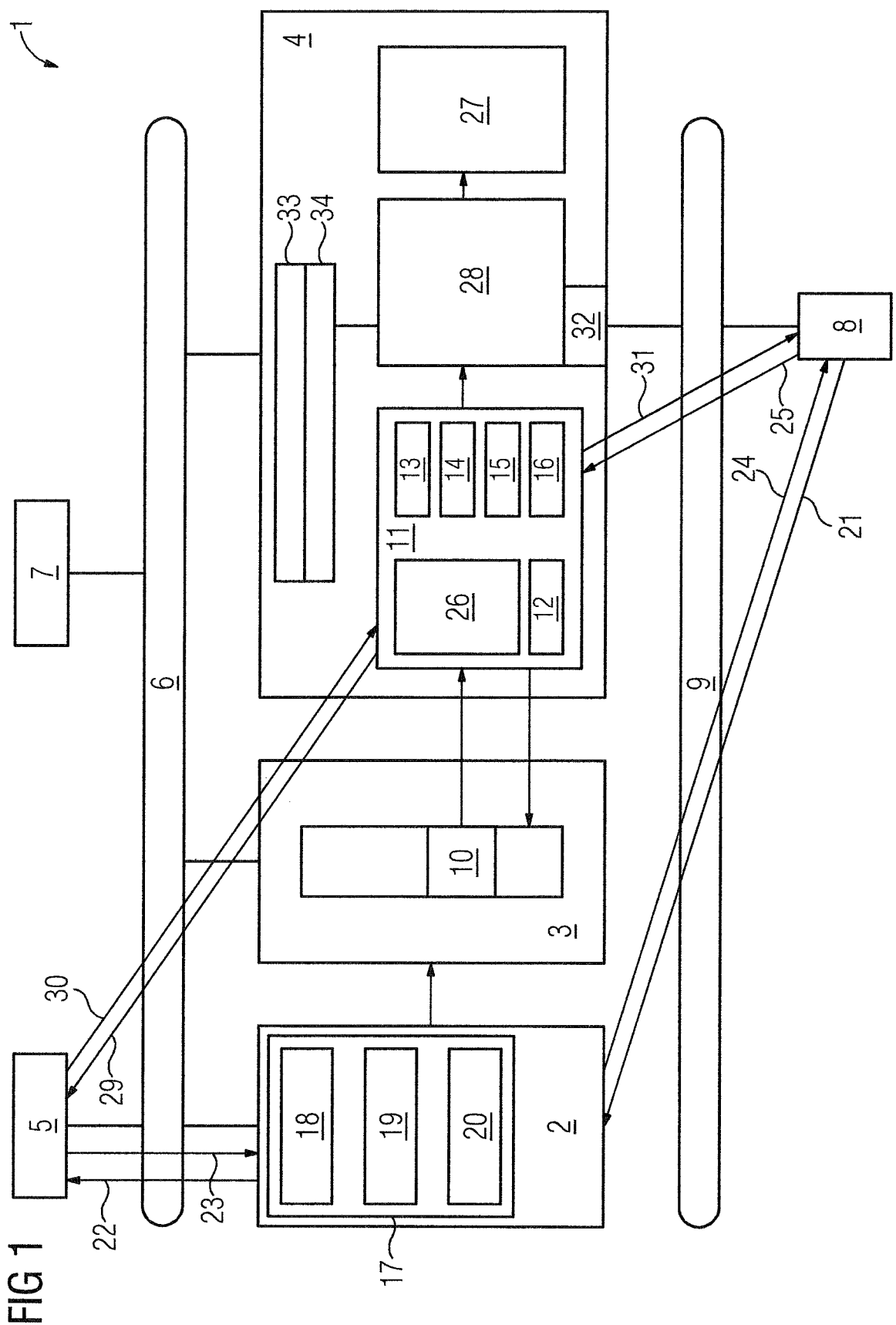
FIG. 1 is a schematic diagram of a control system in accordance with the invention.

FIG. 1 shows a control system 1 of an industrial plant in accordance with the invention. The control system comprises an engineering component or Engineering Station 2 including a processor and memory, a process data archive or Process Historian 3, a server of an operator system or Operator System Server 4 and a certification body or Certification Authority 5. The Engineering Station 2, the Process Historian 3, the Operator System Server 4 and the Certification Authority 5 are connected to one another via a terminal bus 6. A user or Client 7 is connected to the above-stated four components via the terminal bus 6. The terminal bus 6 may, without limitation thereto, for example, be formed as Industrial Ethernet.

A device 8 is connected via a plant bus 9 to the Operator System Server 4. Here, the connected device 8 may alternatively also be an application, in particular a web application. For the purposes of the invention, any desired number of devices and/or applications can be connected to the Operator System Server 4. The plant bus 9 may, without limitation thereto, for example, be formed as Industrial Ethernet. The device 8 can in turn be connected to any desired number of sub-systems (not shown).

A software inventory or Inventory 10 is integrated in the Process Historian 3. A first local registration service 11 is integrated in the Operator System Server 4. The local registration service 11 of the Operator System Server 4 comprises as sub-services a manager service 12, a status service 13, a notifier service 14, a distribution service 15 and a registration service 16, the functioning and tasks of which are explained below. The local registration service 11 furthermore comprises a local data memory 17. The local registration service 11 can alternatively or additionally be integrated in the Engineering System 2.

A second local registration service 17 is integrated in the Engineering System 2. This second local registration service comprises as sub-services a registration service 18, a configuration service 19 and a distribution service 20, the functioning and tasks of which are likewise explained below.

Upon start-up of the industrial plant, all the devices 8 or applications integrated in the industrial plant have to authenticate themselves with the local registration service 17 of the Engineering System 2 in order to be registered as trustworthy communication participants. To this end, the devices/applications 8 send a request 21 for creation of a certificate or "Certificate Signing Request" (CSR). The request from the devices or applications 8 is forwarded via the registration service 18 of the local registration service 17 of the Engineering System 2 to the Certification Authority 5.

For purposes of the present invention, in addition to the actual authentication of the devices 8 or applications, a determination is made about which communications protocols or applications are supported by the respective device 8 or application. Here, local registration service 17 of the Engineering System 2 initially checks, with the assistance of information from the Inventory 10 of the Process Historian 3, which devices/applications 5 are registered as trustworthy communication participants and the certificates to which the devices/applications 8 are entitled. This presupposes that the protocols and applications that are actively supported by the devices/applications 8 integrated in the industrial plant are stored in the Inventory 10. This check has the consequence that only those certificates that are required for use of a specific protocol, such as HTTPS, Secure Syslog or OPC UA, or for use of a specific application are provided to each device or application 8.

The local registration service 17 of the Engineering System 2 then additionally checks whether the devices or applications 8 also actually require the certificates which they support in principle. To this end, the configuration service 19 of the local registration service 17 of the Engineering System 2 determines a network configuration of the industrial plant, including the communication relationships between individual components of the industrial plant, and checks whether the devices/applications 8 also make active use of the communication relationships and thus also actually require the corresponding certificates.

Only if the check is successful does the local registration service 17 of the Engineering System 2 obtain the corresponding certificate on behalf of each device or application 8 via a corresponding Certification Signing Request 22 and an assignment 23 from the Certification Authority 5. The certificate is finally transferred by the distribution service 20 of the local registration service 17 of the Engineering System 2 via an assignment 24 to the respective devices/applications 8. The certificates are thus only assigned as required, thereby distinctly reducing the volume of communication generated by certificate management.

It frequently happens that the Engineering System 2 is not available or is not constantly available at runtime of the industrial plant. To this end, the first local registration service 11 is integrated in the Operator System Server 4. It functions similarly to the second, previously explained registration service 17 in the Engineering System 2. The method for authenticating devices/applications 8 or for allocating certificates thereto at runtime of the industrial plant differs from the previously explained authentication at start-up of the industrial plant substantially in that it is initiated on an event-controlled basis. Such an event is, for example, without limitation thereto, a device replacement during runtime.

Device replacement is reflected in the Inventory via the registration service 16 of the first local registration service 11 without further technical detail being provided at this point.

The manager service 12 of the local registration service 11 loads the information required for checking the Certification Signing Request 25 provided by the replaced device 8 from the Inventory 10 of the Process Historian 3 into a data memory 26 of the local registration service 11. The manager service 12 then initially determines which devices/applications 5 are registered as trustworthy communication participants and the certificates to which the replacement device 8 is entitled. Similarly to the method upon start-up of the technical plant, this check has the consequence that only those certificates that are required for use of a specific protocol, such as HTTPS, Secure Syslog or OPC UA, or for use of a specific application are provided to the replacement device 8.

The manager service 12 additionally checks whether the replacement device 8 also actually requires the certificates that it supports in principle. To this end, the manager service 12 determines a current network configuration of the industrial plant, including the communication relationships between individual components of the industrial plant, and checks whether the replacement device 8 also makes active use of the communication relationships and thus also actually requires the corresponding certificates.

The information about the communication relationships or the network configuration of the industrial plant is obtained by the manager service 12 from a configuration process 27 of a runtime environment 28 of the Operator System Server 4. The information is then stored by the manager service 12 in the Inventory 10 of the Process Historian 3. In addition to the above-mentioned information, the manager service 12 can also store information with regard to relevant Clients 7 in the Inventory 10.

Only if the check is successful does the local registration service 11 of the Operator System Server 4 obtain the corresponding certificate on behalf of the replacement device 8 via a corresponding Certification Signing Request 29 and a corresponding assignment 30 from the Certification Authority 5. The certificate is finally transferred by the distribution service 15 of first local registration service 11 of Operator System Server 4 via an assignment 31 to the replacement device 8. Here, distribution service 15 uses drivers 32 of the runtime environment 28 of the Operator System Server 4.

The certificates are thus only assigned as required at runtime too, thereby distinctly reducing the volume of communication generated by certificate management. At the same time, it is thus possible to replace a device at runtime of the industrial plant, i.e., the industrial plant need not be shut down for device replacement.

Authentication data or certificates can be transferred to the Client or a plurality of Clients 7 via a data source 34 integrated in a visualization service 33 of the Operator System Server 4.

All the certificates that the first local registration service 11 has obtained on behalf of the devices/applications 8 are stored in the data memory 26. The status service 13 of the first local registration service 11 in particular monitors the expiration date of the certificates. If the status service establishes that a certificate will shortly expire, then the first local registration service 11 requests a replacement certificate from the Certification Authority 5. Here, the current configuration of the plant network is in particular taken into account.

This method is particularly advantageous if the Certification Authority 5 is not permanently in operation or accessible at runtime of the industrial plant. In the event that the Certification Authority 5 is temporarily unavailable, the first local registration service 11, controlled by the event "Certification Authority is available again", can check whether an allocated certificate will shortly expire. Should this be the case, the first local registration service 11 requests a replacement certificate from the Certification Authority 5 on behalf of the devices/applications 8.

The notifier service 14 of the first local registration service 11 in particular verifies whether a validity date of the certificates located in the Inventory 10 will shortly expire. In this case, the notifier service 14 generates a corresponding diagnostic message (alarm) via the runtime environment 28 of the Operator System Server 4, such that operators of the control system 1 or maintenance personnel are notified via a corresponding output in "Alarm Controls" of the Clients 7 to subsequently take appropriate action. The notifier service 14 also governs further configuration changes to the industrial plant that are of relevance to certificate management by generating appropriate messages for the operator.

The status service 13 is a further sub-service of the first local registration service 11. At runtime of the industrial plant 1, the status service 13 determines a current status of the certificates in use and stores a duplicate of the status information in the Inventory 10 of the Process Historian 3. An item of status information may be for example, the number and nature of the certificates in use by the devices/applications 8. The status service 13 can also detect whether certificates are still at present being assigned by the distribution service 15 or whether certificates are yet to be assigned in the future. The status service 13 can also log any errors that occur during authentication or certificate allocation.

Figure 2:
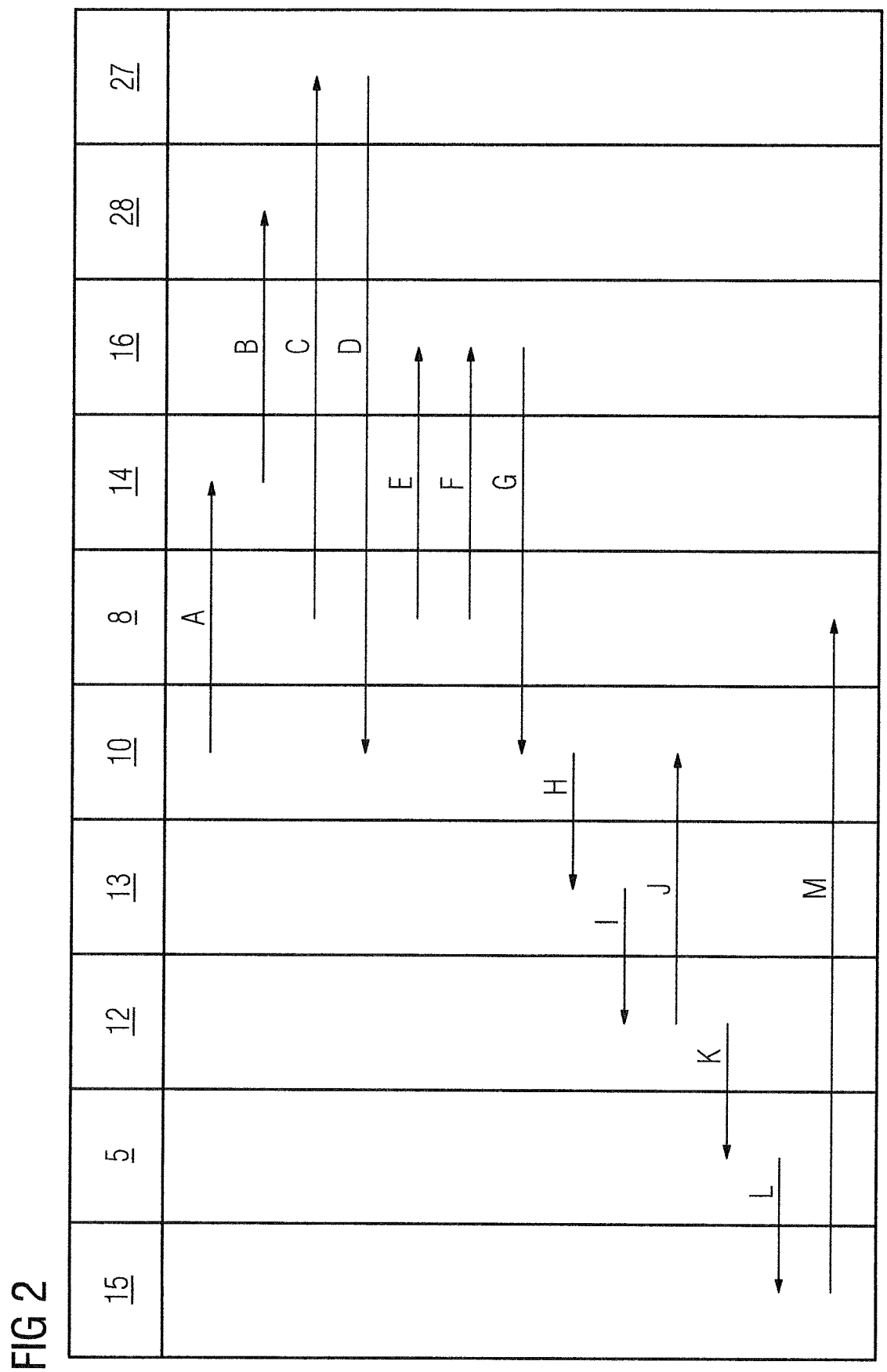
FIG. 2 shows the interaction of various sub-services of a local registration service in the context of a method in accordance with the invention.

FIG. 2 provides an overview of the overlap in terms of timing and content of the individual sub-services of the first local registration service 11. A device replacement at runtime of the industrial plant 1 is explained running chronologically from the top downwards. The successive steps are designated A-M.

Step A: The notifier service 14 establishes that the validity of a certificate of a device 8 will shortly expire. The notifier service 14 obtains this information from the Inventory 10.

Step B: The notifier service 14 sends via the runtime environment 28, a report to an operator of the control system 1 or to maintenance personnel via an appropriate output in "Alarm Controls" of the Clients 7.

Step C: The operator of the control system 1 or the maintenance personnel replaces the device 8. The change in device configuration is reflected in the Operator System Server 4 by the configuration process 27 of the runtime environment 28.

Step D: Replacement of the device 8 is logged in the Inventory 10, where the information is provided by the configuration process 27 of the runtime environment 28. Entries relating to the old, replaced device 8 are removed from the Inventory 10.

Step E: The registration service 16 determines which certificates the newly added device 8 can use.

Step F: The registration service 16 determines which protocols or interfaces are also in active use by the newly added device 8.

Step G: The registration service 16 stores the information determined in steps E and F in the Inventory 10.

Step H: The status service 13 updates a status of the Inventory 10, in particular checking which certificates are currently in use by the devices 8.

Step I: The status service 13 notifies the manager service 12 about the status change which has occurred in the Inventory 10.

Step J: The manager service 12 responds to the status change in the Inventory 10 and begins to check which devices/applications 8 are registered as trustworthy communication participants and to which certificates the replacement device 8 is entitled.

Step K: The manager service requests the corresponding certificate from the Certification Authority 5.

Step L: The Certification Authority 5 checks whether the certificate request originates from a trustworthy local registration service 11 and, if so, provides the distribution service 15 with an operating certificate for the newly added replacement device 8.

Step M: The distribution service 15 transfers the certificate to the replacement device 8 and stores it in the Inventory 10.

Figure 3:
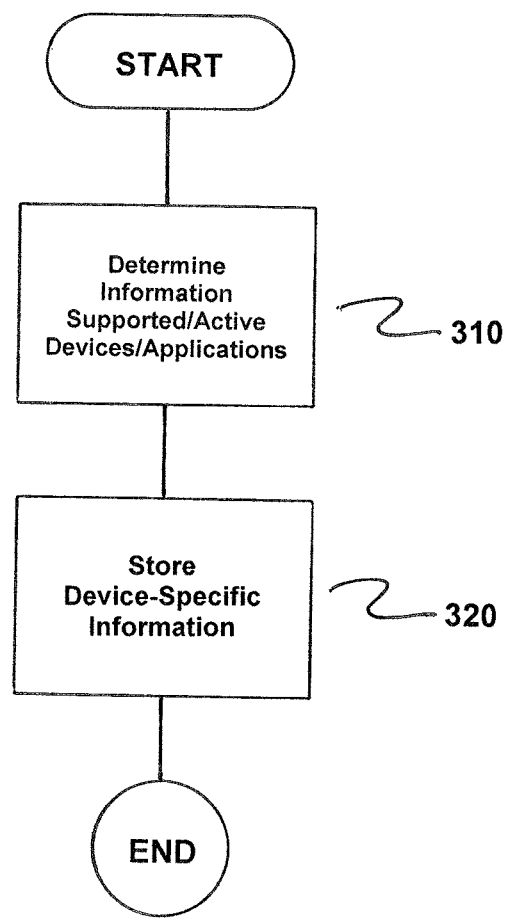
FIG. 3 is a flowchart of the method in accordance with the invention.

FIG. 3 is a flowchart of a method for authenticating at least one of devices 8 and applications web applications, in a control system 1 for an industrial plant, wherein the control system 1 includes at least one local registration service 11, 17 and at least one software inventory 10. The method comprises a) determining by the at least one local registration service 11, 17 information regarding at least one of (i) which communications protocols and/or applications are supported by the devices 8 and/or the applications and (ii)

which communications protocols and/or applications are active, during authentication of at least one of (i) the devices 8 and (ii) the applications within the control system 1, as indicated in step 310.

Next, the device-specific information determined by the at least one local registration service 11, 17 is stored in the software inventory 10 of the control system 1, as indicated in step 320.

Although the invention has been illustrated and described in greater detail with reference to the preferred exemplary embodiment, the invention is not restricted by the disclosed examples and other variations may be derived therefrom by a person skilled in the art without going beyond the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for authenticating at least one of devices and web applications in a control system for an industrial plant, wherein the control system includes an engineering station having a first local registration service, a configuration service and a processor including memory, a system server having a second local registration service which obtains certificates on behalf of a replacement device, a certification authority which is accessible at runtime of the industrial plant and which issues operating certificates for devices or applications after the first local registration service determines a device certificate and a serial number of one of the devices or applications is stored in the at least one software inventory included in the control system, the method comprising:
   a) determining by the first local registration service information regarding at least one of:
      (i) communications protocols or applications supported by one of the devices and the applications, during authentication of at least one of (i) the devices and (ii) the applications within the control system and
      (ii) communications protocols or applications active, during authentication of at least one of (i) the devices and (ii) the applications within the control system; and
   b) storing the device-specific information determined by the first local registration service in the at least one software inventory of the control system including the engineering station having the first local registration service, the configuration service and the processor including memory, the system server having the second local registration service, and including the certification authority which is accessible at runtime of the industrial plant and which issues the operating certificates for the devices or applications such that only certificates required for use of a specific protocol comprising at least Open Platform Communications Unified Architecture (OPC) Unified Architecture (UA) are provided to the replacement device within the industrial plant after the first local registration service determines the device certificate and the serial number of one of the devices or applications is stored in the at least one software inventory of the control system;
   wherein at least one of (i) the devices and (ii) applications authenticate themselves to the first local registration service upon start-up of the industrial plant to register themselves as trustworthy communication participants in the industrial plant.

2. The method as claimed in claim 1, wherein information regarding a configuration of at least one of (i) the control system and (ii) the industrial plant operated with the control system is stored in the at least one software inventory.

3. The method as claimed in claim 2, wherein the information with regard to the configuration of at least one of (i) the control system and (ii) the industrial plant is read out from the engineering station and stored in the at least one software inventory.

4. The method as claimed in claim 1, wherein at least one of (i) the devices and (ii) the applications are authenticated based on operating certificates.

5. The method as claimed in claim 2, wherein the first local registration service reads out the information stored in the at least one software inventory to check, during authentication of at least one of (i) the devices and (ii) the applications, which operating certificate is assignable to at least one of (a) respective device and (ii) a respective application; and
   wherein at least one of (i) the devices and (ii) the applications are authenticated based on operating certificates.

6. The method as claimed in claim 3, wherein the first local registration service reads out the information stored in the software inventory to check, during authentication of at least one of (i) the devices and (ii) the applications, which operating certificate is assignable to at least one of (a) respective device and (ii) a respective application; and
   wherein at least one of (i) the devices and (ii) the applications are authenticated based on operating certificates.

7. The method as claimed in claim 1, wherein the authentication of at least one of (i) the devices and (ii) the applications has a specific period of validity which is stored as device-specific information in the at least one software inventory, wherein, prior to expiration of the specific period of validity of the authentication and independently of a request by at least one of (i) the devices and (ii) the applications, the first local registration service of the control system reads out information regarding the specific period of validity from the at least one software inventory and renews the authentication to extend the period of validity thereof.

8. The method as claimed in claim 1, wherein the applications comprise web applications.

9. A control system for an industrial plant, comprising:
   an engineering station having a first local registration service, a configuration service and a processor including memory;
   a system server having a second local registration service which obtains certificates on behalf of a replacement device;
   a software inventory; and
   a certification authority which is accessible at runtime of the industrial plant and which issues operating certificates for devices or applications after the first local registration service determines a device certificate and a serial number of one of the devices or applications is stored in the software inventory;

wherein the first local registration service authenticates one of the (i) devices and (ii) applications by:
a) determining information regarding at least one of:
   (i) communications protocols or applications supported by one of the devices and the applications, during authentication of at least one of (i) the devices and (ii) the applications within the control system and
   (ii) communications protocols or applications active, during authentication of at least one of (i) the devices and (ii) the applications within the control system; and
b) storing the device-specific information determined in the software inventory of the control system such that only certificates required for use of a specific protocol comprising at least Open Platform Communications Unified Architecture (OPC) Unified Architecture (UA) are provided to the replacement device within the industrial plant;

wherein at least one of (i) the devices and (ii) applications authenticate themselves to the first local registration service upon start-up of the industrial plant to register themselves as trustworthy communication participants in the industrial plant.

10. The control system as claimed in claim 9, further comprising:
at least one process data archive;
wherein the software inventory is integrated in the process data archive.

11. The control system as claimed in claim 9, further comprising at least one operator system.

12. The control system as claimed in claim 10, further comprising at least one operator system.

13. The control system as claimed in claim 9, wherein the industrial plant is operated by the control system.

14. The control system as claimed in claim 10, wherein the industrial plant is operated by the control system.

15. The control system as claimed in claim 11, wherein the industrial plant is operated by the control system.

16. The control system as claimed in claim 9, wherein the applications comprise web applications.

* * * * *